(12) United States Patent
Hong et al.

(10) Patent No.: US 12,088,165 B2
(45) Date of Patent: *Sep. 10, 2024

(54) MOTOR

(71) Applicant: LG Electronics Inc., Seoul (KR)

(72) Inventors: Jin Hong, Seoul (KR); Cheol Han, Seoul (KR); Kwangyong Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,415

(22) Filed: Jan. 10, 2023

(65) Prior Publication Data
US 2023/0163653 A1    May 25, 2023

Related U.S. Application Data

(63) Continuation of application No. 16/794,794, filed on Feb. 19, 2020, now Pat. No. 11,563,349.

(30) Foreign Application Priority Data

Jul. 15, 2019   (KR) ........................ 10-2019-0084976

(51) Int. Cl.
*H02K 3/38*    (2006.01)
*H02K 3/52*    (2006.01)
(Continued)

(52) U.S. Cl.
CPC ............... *H02K 3/38* (2013.01); *H02K 3/522* (2013.01); *A47L 5/28* (2013.01); *A47L 9/22* (2013.01); *H02K 2203/06* (2013.01)

(58) Field of Classification Search
CPC ........... H02K 1/148; H02K 1/16; H02K 1/185
(Continued)

(56) References Cited

U.S. PATENT DOCUMENTS 9,083,210 B2 *   7/2015   Chen .................... H02K 15/022
10,903,711 B2 *   1/2021   Ogawa ..................... H02K 3/38
(Continued)

FOREIGN PATENT DOCUMENTS

CN       101552509       10/2009
DE       112016003652     5/2018
(Continued)

OTHER PUBLICATIONS

Extended European Search Report in European Application No. 20151402.3, dated Aug. 14, 2020, 9 pages.
(Continued)

*Primary Examiner* — Daniel C Puentes
*Assistant Examiner* — Minki Chang
(74) *Attorney, Agent, or Firm* — Fish & Richardson P.C.

(57) ABSTRACT

Various embodiments relate to a motor in which a structure of an insulator is improved. The motor includes an insulator module coupled to a top face of a stator core. The insulator module includes: each power terminal unit connected to each of 3-phases power lead wires; a neutral terminal unit connected to a neutral point of a coil; and an insulator body for achieving insulations between the power and neutral terminal units and the stator core, and between the power and neutral terminal units, wherein the power terminal unit and the neutral terminal unit are positioned at different vertical levels.

20 Claims, 10 Drawing Sheets

(51) Int. Cl.
*A47L 5/28* (2006.01)
*A47L 9/22* (2006.01)

(58) Field of Classification Search
USPC .................................................. 310/216.001
See application file for complete search history.

(56) References Cited

U.S. PATENT DOCUMENTS

| | | | | |
|---|---|---|---|---|
| 2015/0188376 | A1* | 7/2015 | Yamaguchi | H02K 3/28 |
| | | | | 310/71 |
| 2016/0218578 | A1 | 7/2016 | Yamada et al. | |
| 2017/0005535 | A1* | 1/2017 | Gervais | H02K 3/18 |
| 2017/0093239 | A1* | 3/2017 | Teranishi | H02K 3/18 |
| 2018/0241268 | A1* | 8/2018 | Asahi | H02K 3/28 |
| 2018/0323670 | A1* | 11/2018 | Sambuichi | H02K 3/28 |

FOREIGN PATENT DOCUMENTS

| | | |
|---|---|---|
| EP | 2722973 | 4/2014 |
| EP | 3051671 | 8/2016 |
| JP | 2007-014088 | 1/2008 |
| JP | 2009-290921 | 12/2009 |
| JP | 2016-019421 | 2/2016 |
| KR | 20050105021 | 11/2005 |
| KR | 20080068437 | 7/2008 |
| KR | 20150031634 | 3/2015 |
| KR | 20160140032 | 12/2016 |
| KR | 20170128718 | 11/2017 |
| KR | 20180053100 | 5/2018 |
| WO | WO 2011/108736 | 9/2011 |
| WO | WO 2013/076442 | 5/2013 |
| WO | WO 2013/080597 | 6/2013 |
| WO | WO 2014/136488 | 9/2014 |
| WO | WO 2015/162916 | 10/2015 |
| WO | WO 2017/078455 | 5/2017 |

OTHER PUBLICATIONS

Office Action in Australian Application No. 2020200609, dated Dec. 14, 2020, 6 pages.
Office Action in Australian Appln. No. 2020200609, dated Sep. 6, 2021, 5 pages.
Office Action in Taiwanese Application No. 109100978, dated Oct. 28, 2020, 19 pages (with English translation).

* cited by examiner

MOTOR

CROSS-REFERENCE TO RELATED APPLICATIONS

This application is a continuation of U.S. application Ser. No. 16/794,794, filed on Feb. 19, 2020, which claims the benefit of Korean Patent Application No. 10-2019-0084976, filed on Jul. 15, 2019. The disclosures of the prior applications are incorporated by reference in their entirety.

TECHNICAL FIELD

Various embodiments of the present disclosure relate to a motor in which a structure of an insulator is improved.

BACKGROUND

A general motor realizes a driving force via interaction between a stator and a rotor. Basically, structures of the stator and the rotor are the same.

However, types of the motors are divided based on a principle of rotation of the rotor due to the interaction between the stator and the rotor. In addition, the types of the motors may be divided based on a type or a phase of power applied to a stator coil. In addition, the types of the motors may be divided depending on a scheme for winding the stator coil. In an example, a variable voltage motor is of a direct current type, while a 3-phase induction motor is of an alternating current type.

A general structure of the motor includes a rotation shaft, a rotor coupled to the shaft, and a stator fixedly disposed inside a housing. Further, the stator surrounds the rotor and is spaced from the rotor by a predetermined spacing.

In addition, the stator has teeth to wind a coil therearound to generate a rotating magnetic field, thereby inducing electrical interaction between the rotor and the stator to induce rotation of the rotor.

A scheme for winding the coil may include a concentrated winding scheme and a distributed winding scheme. In the concentrated winding scheme, the coil is wound in one slot in a concentrated manner. Further, the distributed winding scheme, the coil is wound in at least two slots in a divided manner.

In the concentrated winding scheme, copper loss may be reduced via reducing a winding amount, compared to the distributed winding scheme. However, the coil is excessively concentrated in the slot, causing a large change in a magnetic flux density and increasing core loss (or iron loss), that is, power loss of the iron core. Thus, the concentrated winding scheme is generally used in a small motor.

Recently, motors used in various home appliances (such as hair dryers, cleaners, and the like) have been developed to overcome spatial restriction and improve an insulation performance due to demands of miniaturization and performance improvement.

In order to improve the performance of the motor, it is necessary to increase the number of windings of the coil in a winding space or increase a diameter of the coil. However, the winding space defined between the teeth of the stator is limited in size. Insulation of the coil is not secured when a size of the stator is reduced to follow a trend of lightening the motor. This may adversely affect the performance of the motor.

In Patent Document 1 (KR 10-2015-0031634, published on Mar. 25, 2015), a structure of an insulator is simplified by arranging terminals with the same shape such that center axes of virtual circles formed by extending an inner circumferential faces thereof are different from each other. Further, Patent Document 2 (KR 10-2017-0052986, published on May 15, 2017) discloses a structure in which a fixing portion protruding from a bus-bar is inserted into a slot portion defined in an insulator to couple the bus-bar and a stator with each other. Further, Patent Document 3 (KR 10-2016-0139824, published on Dec. 7, 2016) discloses a structure in which a structure of a terminal of a bus-bar is improved, so that the terminal is fitted to a top face of a stator in an annular structure. Further, Patent document 4 (KR 10-2016-0030924, published on Mar. 21, 2016) discloses a structure in which input/output terminals of a bus-bar are alternately arranged in a vertical direction on an outer circumference.

However, in the structures of the bus-bar and the insulator applied to the above-mentioned patent documents, a plurality of bus-bars are arranged inwardly of an outer diameter of the motor, and connection of lead wires is achieved while winding the lead wires around the insulator. This requires a lot of space in a radial direction.

In particular, when the terminals are located on the same plane as in the structure of Patent Document 1, utilization of the space is increased, but a lot of space is required in the radial direction as described for securing insulation between the terminals. Further, when the space in the radial direction is reduced, it is difficult to secure the insulation.

Therefore, there is a need for structural improvement allowing achieving miniaturization of the motor and at the same time ensuring the insulation performance.

PRIOR ART DOCUMENT

Patent Document

Patent Document 1: KR 10-2015-0031634 (published on Mar. 25, 2015)

Patent Document 2: KR 10-2017-0052986 (published on May 15, 2017)

Patent Document 3: KR 10-2016-0139824 (published on Dec. 7, 2016)

Patent document 4: KR 10-2016-0030924 (published on Mar. 21, 2016)

SUMMARY

One purpose of the present disclosure is to provide a motor with improved bus-bar and insulator structures by which spatial restrictions caused by miniaturization of the motor may be overcome.

Further, another purpose of the present disclosure is to provide a motor with improved bus-bar and insulator structures by which the motor is minimized while insulation performance is secured.

Further, another purpose of the present disclosure is to provide a high-speed 3-phase motor having a teeth-divided core and a concentrated winding to ensure performance improvement and miniaturization.

Further, another purpose of the present disclosure is to provide a motor in which connections of U, V, and W phases lead wires and neutral-point lead wires to terminals may be achieved while overcoming spatial restriction in a stator's outer diameter and a radial direction of a back yoke.

Further, another purpose of the present disclosure is to provide a motor with an improved insulator structure such that an insulation distance for each of U, V, W, and neutral-point lead wires may be secured while overcoming spatial restriction in a radial direction of a back yoke.

Further, another purpose of the present disclosure is to provide a motor in which connection of a bus-bar and an insulator is realized within a radial region of a stator core for miniaturization of the motor.

Further, another purpose of the present disclosure is to provide a motor in which a teeth-divided core is coupled to a stator core in an axial direction for connection of the lead wires to terminals.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

To achieve the various purpose of the present disclosure, an exemplary embodiment of the present disclosure provides a motor in which a bus-bar, a neutral-point lead wire, and an insulator are vertically stacked.

An exemplary embodiment of the present disclosure provides a motor in which connection of the U, V, and W phases lead wires to terminals and connection of the neutral-point lead wires to terminals may be realized in opposite faces of the stator core.

An exemplary embodiment of the present disclosure provides a motor in which insulation performance may be improved by ensuring an insulation distance between a stator core, a bus-bar (U, V, and W phases lead wires), and a neutral-point lead wire connection ring.

In a first aspect, the present disclosure proposes a motor comprising: a stator; and a rotor rotatable with respect to the stator, wherein the stator includes: a stator core defining a back yoke; teeth extending radially from the back yoke; each coil wound around each tooth, wherein ends of the coils are respectively drawn out of the teeth to define 3-phases power lead wires of the coils; and an insulator module coupled to a top face of the stator core, wherein the insulator module includes: each power terminal unit connected to each of the 3-phases power lead wires; a neutral terminal unit connected to a neutral point of the coil; and an insulator body for achieving insulations between the power and neutral terminal units and the stator core, and between the power and neutral terminal units, wherein the power terminal unit and the neutral terminal unit are positioned at different vertical levels.

In one implementation, each power terminal unit includes: a power terminal disposed on a top face of the insulator body and connected to each of the 3-phases power lead wires; and a connection terminal connected to the power terminal and thus connected to each of the 3-phases power lead wires.

In one implementation, the power terminal includes: a power terminal body protruding from the top face of the insulator body; and a guide groove defined in the power terminal body to receive and guide each of the 3-phase power lead wires.

In one implementation, each power terminal unit includes a power connecting member having one end connected to the power terminal and the other end connected to the connection terminal.

The motor of claim 4, wherein the power connecting member is disposed on a portion of a top face of the insulator body.

In one implementation, each of the 3-phases lead wires is drawn radially and outwardly of the back yoke and is connected to each power terminal.

In one implementation, the other ends of the coils are respectively drawn out of the teeth to define neutral-point lead wires of the coils, wherein the neutral terminal unit includes: each neutral terminal protruding in a radial direction of the back yoke and connected to each neutral-point lead wire; and a neutral connecting member for connecting the neutral terminals with each other.

In one implementation, the neutral connecting member defines a portion of an inner face of the insulator module.

In one implementation, the neutral terminals have the same vertical level.

In one implementation, the insulator body includes: a lower insulator body positioned on a top face of the stator core to insulate the stator core from the neutral terminal unit; and an upper insulator body positioned on a top face of the lower insulator body to insulate the neutral terminal unit from the power terminal unit.

In one implementation, the lower insulator body includes a first face in contact with a top face of the stator core, and a second face having a receiving groove defined therein for receiving the neutral terminal unit therein, wherein the upper insulator body includes a third face being in contact with the second face and having a receiving groove defined therein for receiving the neutral terminal unit therein, and a fourth face having a receiving groove defined therein for receiving the power terminal unit therein.

In one implementation, the third face and the fourth face are spaced apart by a predetermined vertical dimension from each other so that a height of the upper insulator body has the predetermined dimension, wherein a sum of vertical dimensions of the receiving grooves formed in the third and fourth faces respectively is smaller than the predetermined dimension.

In a second aspect, the present disclosure proposes a motor comprising: a stator; and a rotor rotatable with respect to the stator, wherein the stator includes: a stator core having an inner circumferential face defining a back yoke, and a groove defined along the inner circumferential face; teeth, each tooth including a coupling portion received in the groove and a wound portion extending from the coupling portion radially and inwardly of the back yoke; each coil wound around each tooth; and an insulator module coupled to a top face of the stator core, wherein the insulator module includes: a plurality of terminal units connected to the coils; and an insulator body for insulating the terminal units from the stator core and for insulating between the plurality of terminal units, wherein the plurality of terminal units and the insulator body are stacked vertically to form the insulator module.

In one implementation, ends of the coils are respectively drawn out of the teeth to define 3-phases power lead wires of the coils, while the other ends of the coils are respectively drawn out of the teeth to define neutral-point lead wires of the coils, wherein the plurality of terminals includes: each power terminal unit connected to each of the 3-phases power lead wires; and a neutral terminal unit connected to the neutral-point lead wires.

In one implementation, each power terminal unit includes each power terminal connected to each of the 3-phases power lead wires and disposed on a top face of the insulator body and in a radial region of the back yoke, wherein the neutral terminal unit includes each neutral terminal connected to each neutral-point lead wire and disposed radially and inwardly of the back yoke.

In one implementation, each of the 3-phases lead wires is drawn radially and outwardly of the back yoke and is connected to each power terminal.

In one implementation, each power terminal unit further includes: a connection terminal connected to the power terminal and thus connected to each of the 3-phases power lead wires; and a power connecting member having one end connected to the power terminal and the other end connected to the connection terminal.

In one implementation, the connection terminal and the power connecting member are located in a radial region of the insulator body.

In one implementation, each of the neutral-point lead wires is connected to each neutral terminal disposed inwardly of the insulator body.

In one implementation, the neutral terminal unit further includes a neutral connecting member for connecting the neutral terminals with each other, wherein the neutral connecting member is disposed in a groove defined in an inner face of the insulator body.

The features of the above-described embodiments may be implemented in a combined manner in other embodiments as long as they are not inconsistent with other embodiments.

Effects of the present disclosure are as follows but are not limited thereto.

According to the present disclosure, an outer diameter of the stator may be reduced and a radial thickness of the back yoke may be reduced, thereby realizing miniaturization and weight lightening of the motor.

In addition, connection of the 3-phases (U, V, W) and neutral-point lead wires to the terminals may be achieved while not being limited based on the radial thickness of the back yoke.

In addition, the insulator module is coupled to the stator core in the axial direction. This may minimize the radial thickness of the stator core such that the motor may be miniaturized.

In addition, the insulation distances between the stator core and the bus-bar (U, V, and W phases lead wires) and the neutral-point lead wire connection ring are secured to ensure insulation improvement.

In addition, in order to speed up and miniaturize the motor, the concentrated winding scheme around the teeth-divided core may be applied. The teeth-divided core may be axially coupled to the stator core to facilitate the lead wire connection to the terminals.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
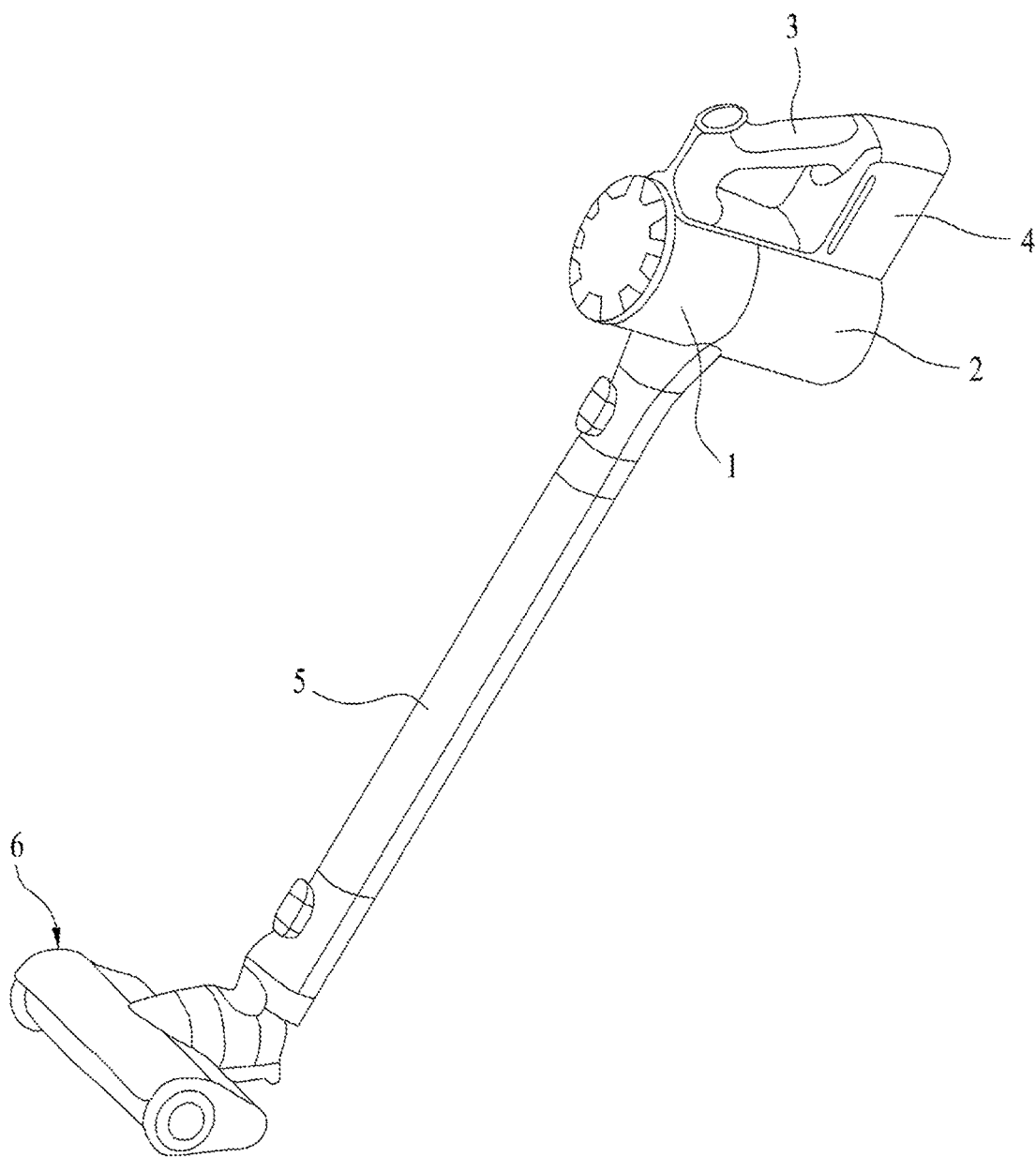
FIG. 1 is a perspective view of a conventional cleaner.

For simplicity and clarity of illustration, elements in the figures are not necessarily drawn to scale. The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a conventional cleaner.

Referring to FIG. 1, a vacuum cleaner may include a cleaner main body 1 with a motor for generating a suction force, a suction nozzle 6 for sucking air containing dust, and an extension tube 5 for connecting the cleaner main body 1 and the suction nozzle 6 with each other.

Although not shown, the suction nozzle 6 may be directly connected to the cleaner main body 1 without the extension tube 5.

The cleaner main body 1 may include a dust container 2 in which dust separated from air is stored. Accordingly, dust introduced through the suction nozzle 6 may be stored in the dust container 2 through the extension tube 5.

The cleaner main body 1 may be provided with a handle 3 for a user to grip. The user may perform cleaning while gripping the handle 3. The cleaner main body 1 may include a battery (not shown), and the cleaner main body 1 may include a battery accommodating portion 4 in which the battery (not shown) is accommodated. The battery accommodating portion 4 may be provided below the handle 3. The battery (not shown) may be connected to the suction nozzle 6 to supply power to the suction nozzle 6.

Figure 2:
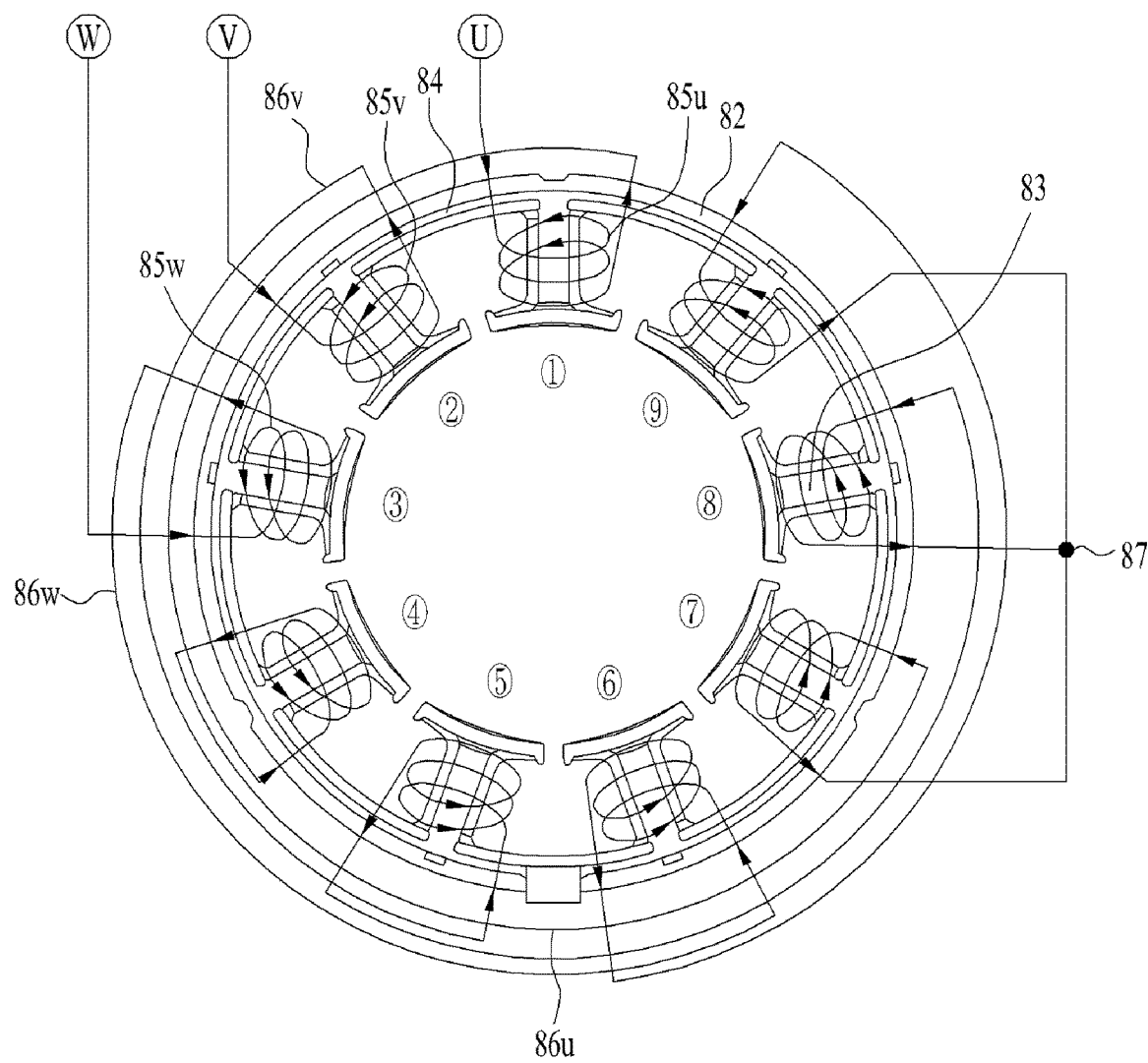
FIG. 2 is a plan view illustrating winding of a conventional coil.

FIG. 2 is a plan view illustrating winding of a conventional coil.

Referring to FIG. 2, a structure of a conventional inner rotor type motor and coil winding thereof will be described. In the conventional inner rotor type motor, teeth 83 extend from a stator core 82 radially inwardly of the stator core 82. The conventional inner rotor type motor may include an insulator 84 for insulating the stator core 82 from the coil.

In the conventional coil winding, a u-phase coil 85u is wound around a 1st tooth 83 clockwise (in a direction of an arrow). The coil does not necessarily have to be wound clockwise. In either case, coils of respective phases have to be wound in the same direction.

When the coil winding around the tooth 83 is finished, the u-phase coil 85u is drawn out of the insulator 84 and then is wound around 4th and 7th teeth sequentially in the same direction as the direction in which the coil is wound around the 1st tooth. Thus, two coil connection wires 86u may be formed outwardly of the insulator 84. Similarly, a v-phase coil 85v is wound around 2nd, 5th, and 8th teeth sequentially in the same manner as the winding manner of the u-phase coil. Thus, two connection wires 86v may be formed. Further, a w-phase coil 85w is wounded around 3rd, 6th, and 9th teeth sequentially. Thus, two connection wires 86w may be formed. The 3-phases power coils are wound around the 9th, 8th, and 7th teeth, respectively, and then are drawn out of the insulator 84 and are joined with each other to form a neutral-point lead wire 87 outwardly of the insulator 84.

The connection wires 86 extend along an outer circumferential face of the insulator. Further, arrangement and insulation of the connection wires 86 are performed by utilizing a radial thickness of a back yoke defining the stator core 82.

That is, in the conventional motor, the arrangement and insulation of the lead wires of the coils are performed using the radial thickness of the back yoke. This causes difficulty in miniaturizing and reducing an overall size of the motor. In addition, although not shown in the drawing, a terminal to connect to each of the 3-phases power lead wires and the neutral-point lead wire should be disposed within the radial thickness of the back yoke to secure an insulation distance.

FIG. 1 and FIG. 2 as described above have described the schematic configurations of the small motor and the inner rotor type motor used in the cleaners. A motor to be described in following embodiments of the present disclosure is also a small motor used in the cleaner or the like. The motor includes an insulator structure allowing securing an insulation performance of the motor while reducing a size and a weight of the motor.

Hereinafter, a motor according to an embodiment of the present disclosure will be described with reference to FIGS. 3 to 10.

Figure 3:
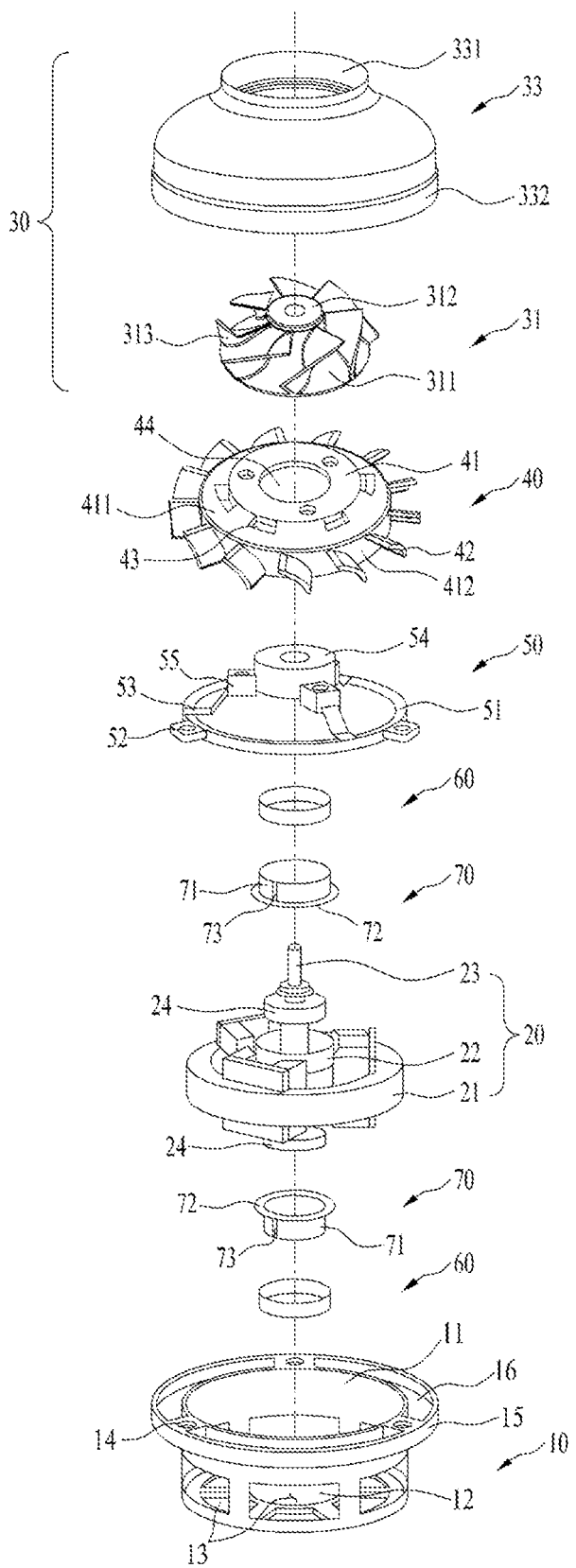
FIG. 3 shows an overall configuration of a motor according to an embodiment of the present disclosure.

FIG. 3 shows an overall configuration of a motor according to an embodiment of the present disclosure.

FIG. 3 shows an overall motor structure of the present embodiment. Connection and insulation structures of the coils and a structure of the insulator will be omitted in FIG. 3. Those omitted in the present drawing will be described in FIGS. 4 to 10 below. It will be understood that the features of FIGS. 4 to 10 are applied to the overall configuration of FIG. 3.

A motor assembly in accordance with the present embodiment includes a motor 20, a housing for receiving the motor 20 therein and defining an overall frame of the motor, a flow generator 30 installed on a top of the housing to generate air flow, and a diffuser 40 for dispersing the air flow generated by the flow generator 30.

The motor 20 includes an annular stator 21, a shaft 23 penetrating a center of the stator 21, and a rotor 22 into which the shaft 23 is mounted. The rotor 22 generates a rotational force via interaction with the stator 21. Further, the shaft 23 is rotatably supported by a bearing 24.

The motor 20 of the present embodiment is illustrated as a brushless direct current motor (BLDC motor). In the present drawing about the BLDC motor, a structure in which the stator 21 is disposed outwardly of the rotor 22 is illustrated. However, the present disclosure is not limited thereto. A motor having a structure in which the stator 21 is disposed inwardly of the rotor 22 is not excluded.

In the drawing, the motor housing 10 is shown below the motor 20 and has a space defined therein for accommodating the motor 20 therein. The motor housing 10 includes a cylindrical motor mounting portion 11 with an open top, a connection arm 14 radially outwardly extending from an upper end of the motor mounting portion 11, and an annular body coupling portion 15 provided at an end of the connection arm 14 and having a diameter larger than that of the motor mounting portion 11. A bottom center portion of the motor mounting portion 11 may include a bearing support 12 for fixing and supporting a bearing 24 at a lower portion of the motor 20.

The bearing 24 may be installed in a form of a bearing assembly in which a bearing holder 70 and an elastic mesh 60 are sequentially wound on an outer circumferential face of the bearing 24.

A bracket 50, the diffuser 40, and the flow generator 30 may be provided above the motor 20, and the flow generator 30 may include an impeller 31 and an impeller cover 33.

The bracket 50 may include a center portion 54 aligned with a hole 45 defined in a central portion of the diffuser and a support 51 formed in an annular shape and having a radius larger than that of the center portion 54. Further, a connecting portion 53 for connecting the center portion 54 and the support 51 with each other may be formed.

In addition, the support 51 may include a fastening portion 52 protruding in a radial direction to be fastened to the motor housing 10, thereby supporting an upper portion of the motor 20.

The diffuser 40 has the hole 45 defined in the center portion thereof.

Further, a plurality of cooling flow path outlets 43 are provided along an outer circumferential face of the hole 45 to define flow paths through which heat generated by the motor 20 discharges.

In one example, a cylindrical portion 412 for forming an outer diameter corresponding to an outer diameter of a side wall of the motor mounting portion 11 along a radial direction of the diffuser 40 is formed and a plurality of vanes 42 are formed along an outer circumferential face of the cylindrical portion 412, thereby guiding flow of air pressurized by the impeller 31.

The impeller 31 is installed above the diffuser 40, and a shaft hole 312 into which the shaft 23 is inserted is provided at a center of the impeller 31. The impeller 31 may be a diagonal flow type impeller in which the shaft hole 312 is defined in a hub 311 that supports the impeller 31 for securing an overall rigidity thereof, the hub 311 has a face inclined downward in a radial direction from a center of rotation, and a radial blade 313 is included.

The impeller cover 33 includes an air inlet 331 defined in an upper center portion thereof, which is a passage through which air moves, and is provided in a form inclined downward with respect to the air inlet 331. A cover coupling portion 332 is provided at a lower end of the impeller cover 33. The cover coupling portion 332 may be provided in a step shape, and the body coupling portion 15 may be fitted into the step-shaped cover coupling portion 332.

Figure 4:
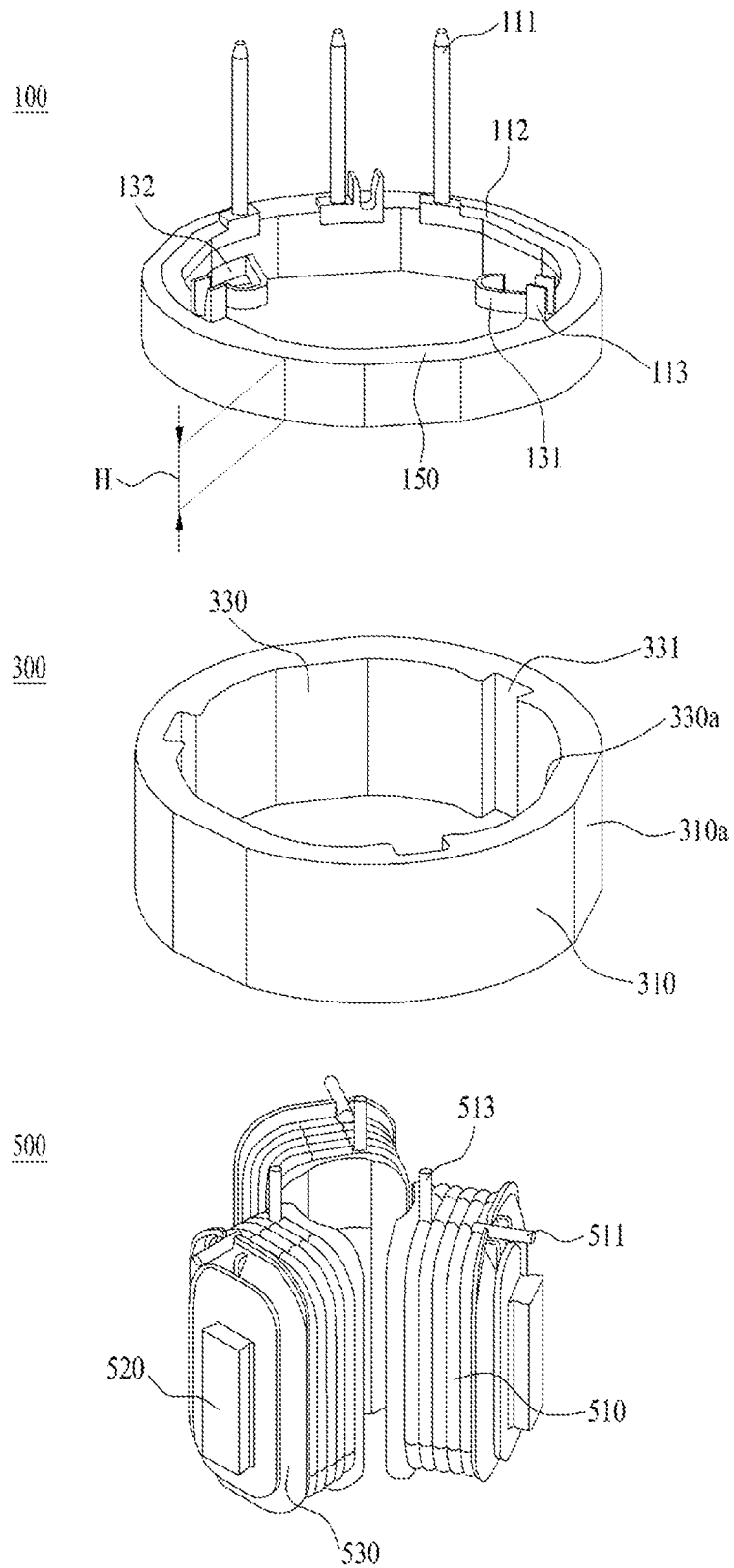
FIG. 4 is an exploded perspective view of a motor according to one embodiment of the present disclosure.

FIG. 4 is an exploded perspective view of a motor according to one embodiment of the present disclosure.

Referring to FIG. 4, a motor of the present embodiment includes a stator and a rotor configured to rotate with respect to the stator. The stator may include a stator core 300 defining a back yoke, teeth 520 extending in a radial direction from the back yoke, a coil 510, an insulator module 100 coupled to a top face of the stator core 300, and a divided-core 500 inserted into the stator core 300 in an axial direction.

The teeth 520 extend radially inwardly (inner type) of the back yoke in the present embodiment. However, the present disclosure is not necessarily limited thereto. The teeth 520 may extend radially outwardly (outer type) of the back yoke.

The stator core is formed in a hollow cylindrical shape. Thus, the stator core defines an arc of the back yoke. As used herein, a radial and inward direction refers to a direction radially and inwardly of an arc of an inner face of the stator core or means a direction radially and inwardly of the back yoke.

In addition, in the present embodiment, a configuration is described in which a concentrated winding scheme around the teeth 520 is applied and a teeth-divided core is inserted into the stator core 300 in an axial direction (longitudinal direction) thereof. This configuration is employed because space constraint occurs due to a small size of the stator core 300 caused by the miniaturization of the motor and, thus, it is difficult to couple the teeth-divided core with the back yoke of the stator in a radial direction of the motor.

The insulator module 100 may be coupled to a top face of the stator core 300 and include terminal units 110 and 130 connected to lead wires 511 and 513 from the divided core 500. An insulator body 150 of the insulator module 100 may have a predetermined height H for insulation of the lead wires 511 and 513 and insulation between the terminal units.

The terminal units 110 and 130 may be positioned at different vertical levels within the predetermined height H. The terminal units 110 and 130 may define different layer layers of the insulator module 100. The layers defined by the terminal units 110 and 130 and the insulator body 150 may be combined with each other to form the insulator module 100. A detailed structure thereof will be described later.

In one example, the insulator module 100 includes each power terminal unit 110 connected to each of 3-phases power lead wires of the coils 510, a neutral terminal unit 130 connected to a neutral point of the coil 510, and the insulator body 150 to achieve insulation between the stator core 300 and the terminal units 110 and 130 and between the terminal units 110 and 130.

The insulator module 100 may be formed by insert injection molding the terminal units 110 and 130 and the insulator body 150. However, the present disclosure is not necessarily limited thereto. As will be described below, the terminal units 110 and 130 and the insulator body 150 may be stacked on each other to form the insulator module 100. That is, members defining layers respectively may be stacked on each other to form the insulator module 100.

When the insulator module 100 is formed using the stacking scheme, the layers may be fixed to each other via various methods. In one example, grooves and protrusions are formed in and on the layers constituting the insulator module 100, and then the protrusions may be press-fitted into the corresponding grooves, such that the layers may be fixed to each other. Alternatively, the layers may be fixed to each other by applying an adhesive to faces of the layers and bonding the layers to each other.

The power terminal units 110 and the neutral terminal unit 130 may be located at different vertical levels in the insulator body 150. A spacing between the vertical levels of the terminal units 110 and 130 may be contained in the predetermined height H of the body 150 of the insulator module 100.

In the present embodiment, the power terminal unit 110 is located at a top level of the body 150 of the insulator module 100, while the neutral terminal unit 130 is located at a middle level of the body 150 of the insulator module 100. In detail, the power terminal unit 110 may define a portion of a top face of the insulator module 100, while the neutral terminal unit 130 may define a portion of an inner circumferential face of the insulator module 100.

The predetermined height H may mean a vertical dimension to a top from a bottom of the body 150 of the insulator module 100. The height H may be preferably defined as a vertical dimension of the insulator body 150. However, the present disclosure may not be limited thereto. When the power terminal unit 110 protrudes from a top of the insulator module 100, the height may include a vertical dimension from the bottom of the insulator module 100 to the top of the power terminal unit 110.

Further, for example, while maintaining the relative difference between the vertical levels of the power terminal unit 110 and the neutral terminal unit 130, the insulator body 150 may be configured to surround the top face 112*u* of a power connecting member as described later of the power terminal unit 110. In this case, the predetermined height H means a vertical dimension from the bottom to the top of the insulator module 100. The insulator body 150 may define a top layer and a bottom layer of the insulator module 100.

In one example, as the insulator module 100 has the predetermined height H, this may realize insulation between the terminal units 110*m* and 130 and the stator core 300. Further, the terminal units 110 and 130 are located at different vertical levels within the predetermined height H, so that the insulation between the terminal units 110 and 130 can be performed.

The stator core 300 may be formed in a cylindrical shape having inner space into which the divided-core 500 is inserted. Each of the inner circumferential face and the outer circumferential face of the stator core 300 may be partially flattened.

That is, planar faces 310a and 330a may be formed on the inner circumferential face and the outer circumferential face of the stator core 300, respectively.

Due to the planar faces 310a and 330a, the radial thickness of the stator core 300 may be reduced to reduce the overall size of the motor. Further, due to the planar faces 310a and 330a, a portion that may act as a resisting portion against magnetic flux flowing through the stator core 300 may be reduced to improve the performance of the motor.

In one example, a shape of the body of the insulator module 100 may be a hollow cylindrical shape, which corresponds to the shape of the stator core 300. Planar faces 150a may be formed at portions of the outer and inner circumferential faces of the insulator body 151 that are in contact with the planar faces 310a and 330a respectively.

In addition, at least one groove 331 may be defined in a portion of the inner circumferential face 330 of the stator core 300 along a circumference of the inner circumferential face 330. A tooth 520 of the divided-core 500 may be engaged with the groove 331 in the axial direction (the longitudinal direction of the stator core).

Figure 5A:
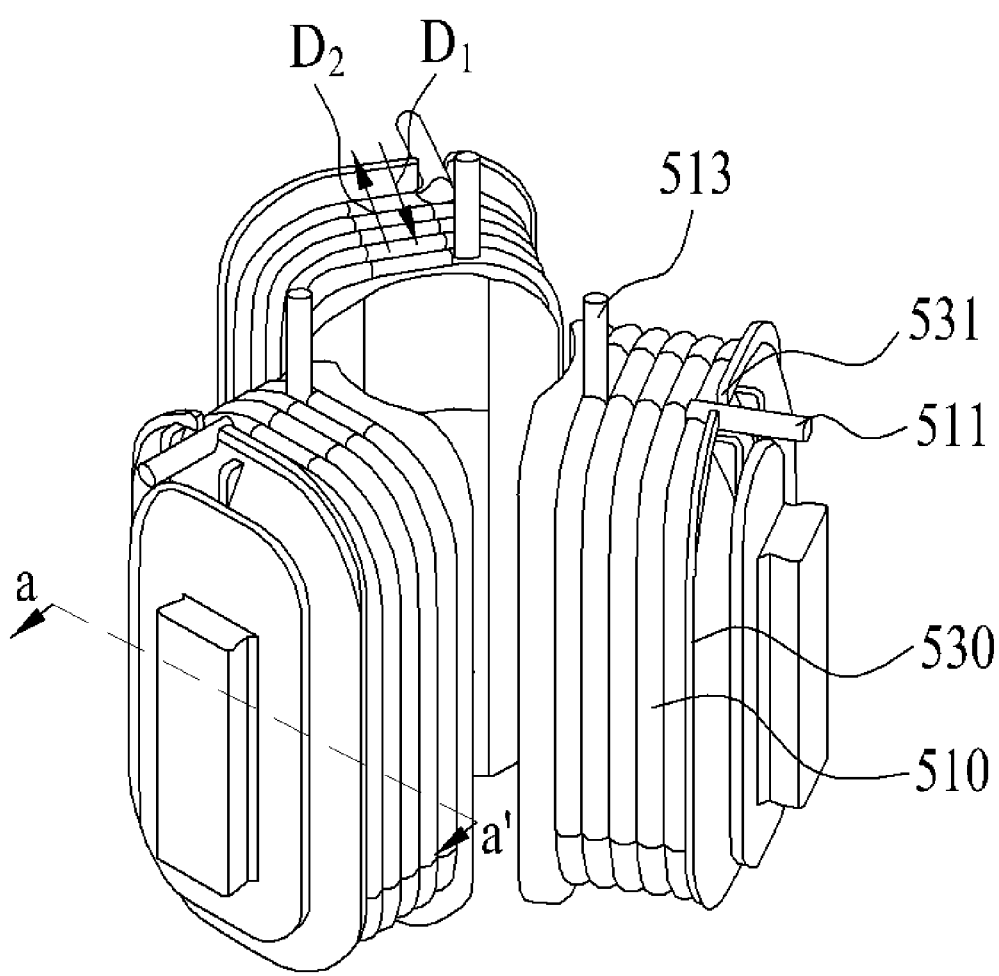
FIG. 5A is a perspective view of a divided-core of FIG. 4.
Figure 5B:
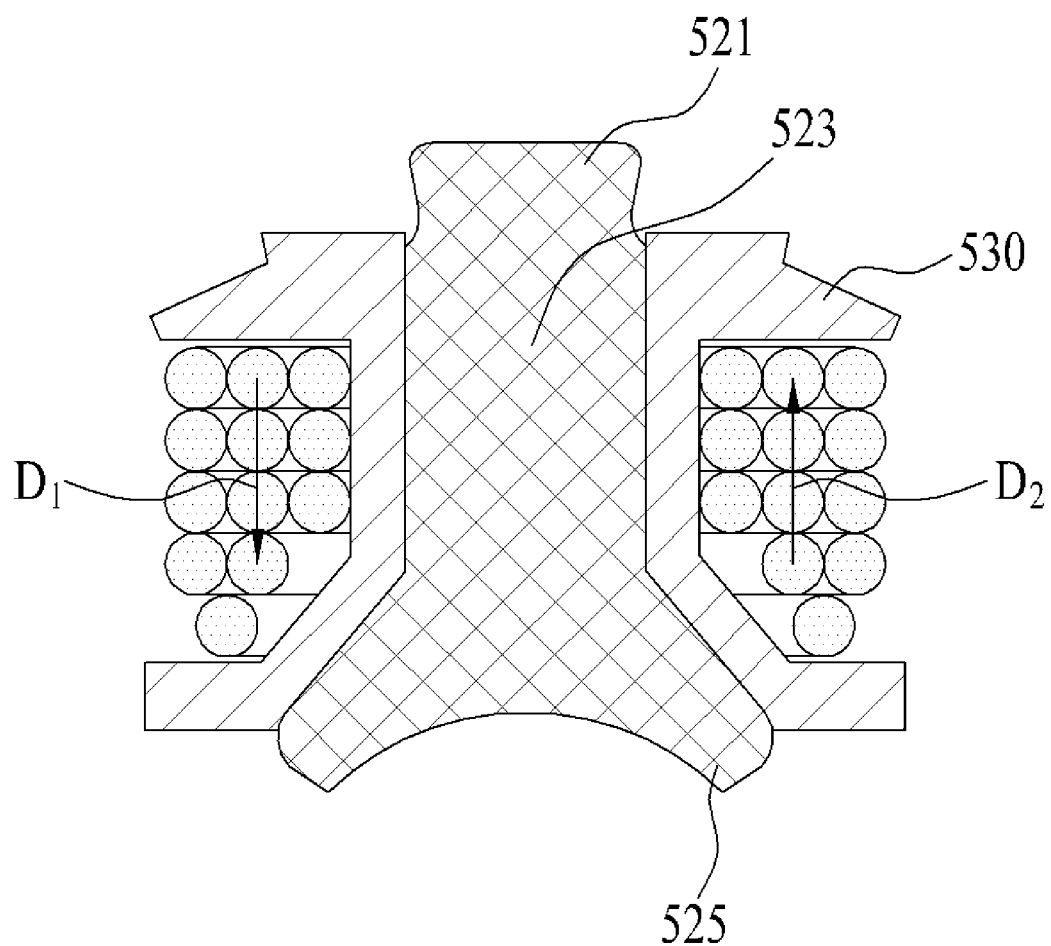
FIG. 5B is a cross-sectional view taken along a line of a-a' of FIG. 5A.

FIG. 5A is a perspective view of a divided-core of FIG. 4. FIG. 5B is a cross-sectional view taken along a line of a-a' of FIG. 5A.

Referring to FIGS. 5A and 5B, the divided-core 500 of the present embodiment is a teeth-divided core. Further, the divided-core 500 may be inserted into the stator core 300 along an axial direction perpendicular to the radial direction of the stator core 300.

The core 500 may include an insulator 530 surrounding the tooth 520 and insulating the coil 510 from the tooth 520. The insulator 530 surrounds outer faces of a wound portion 523 and a pole shoe 525 of the tooth 520 and defines a section in which the coil 510 is wound. As described above, the coil 510 may be wound around the tooth 520 in a concentrated winding manner. Further, the 3-phases power lead wires 511 may be drawn horizontally and outwardly of the divided-core 500 from a top portion of the core 500. Further, the neutral-point lead wires 513 may be drawn horizontally from a top portion of the divided-core 500 and downwardly.

The motor of the present embodiment has a structure in which the divided-core 500 is inserted into the stator core 300 along the axial direction from a position below the stator core 300, and the insulator module 100 is brought into contact with the top face of the stator core 300 in the axial direction. Thus, the 3-phases power lead wires 511 should be connected to the terminals on the insulator module 100, while the neutral-point lead wires 513 should be connected to the terminals on the insulator module 100. Therefore, the lead wires from the coil 510 may be preferably drawn out from a top portion of the divided-core 500.

In one example, when the coil 510 is wound in a first direction D1, the coil 510 is wound radially and inwardly of the tooth 520. The winding may begin in a clockwise or counterclockwise direction, downwardly of the tooth 520. Then, the coil 520 may be wound upwardly of the tooth 520 and then connected to the terminal.

When the coil 510 is wound in a second direction D2, the coil 510 is wound radially and outwardly of the tooth 520. The winding may begin in a clockwise or counterclockwise direction, downwardly of the tooth 520. Then, the coil 520 may be wound upwardly of the tooth 520 and then connected to the terminal.

A top portion of the tooth 520 may mean a portion close to the insulator module 100, and a bottom portion of the tooth 520 may mean an opposite portion to the top portion.

As a result, even when the coil 510 is wound in one of the first direction D1 and the second direction D2, the 3-phases power lead wires 511 may be drawn horizontally and outwardly of the teeth 520 from the top portion of the core 500.

The power terminal 113 to be described later is provided on the top face of the insulator module 100. The neutral terminal 131 is disposed on an inner face of the insulator module 100. Thus, the 3-phase power lead wires 511 and the neutral-point lead wires 513 may be connected to the terminals in the radial region of the back yoke, that is, in the radial region of the stator core 300.

In one example, the tooth 520 may include a coupling portion 521 coupled to the groove 331 of the stator core 300, the wound portion 523 extending from the coupling portion 521 in the radial direction of the back yoke, and the pole shoe 525 branching from the wound portion 523 and constituting a magnetic circuit.

The insulator 530 surrounds outer faces of a wound portion 523 and a pole shoe 525 of the tooth 520 and defines a section in which the coil 510 is wound.

The pole shoe 525 branches from the wound portion 523 and has a curved inner face along a virtual circumferential face inside the stator core 300. Further, each of the neutral-point lead wires 513 may be connected to the terminal at a position between the inner circumferential face 330 of the stator core 300 and the virtual circumferential surface to ensure an insulation performance.

Figure 6A:
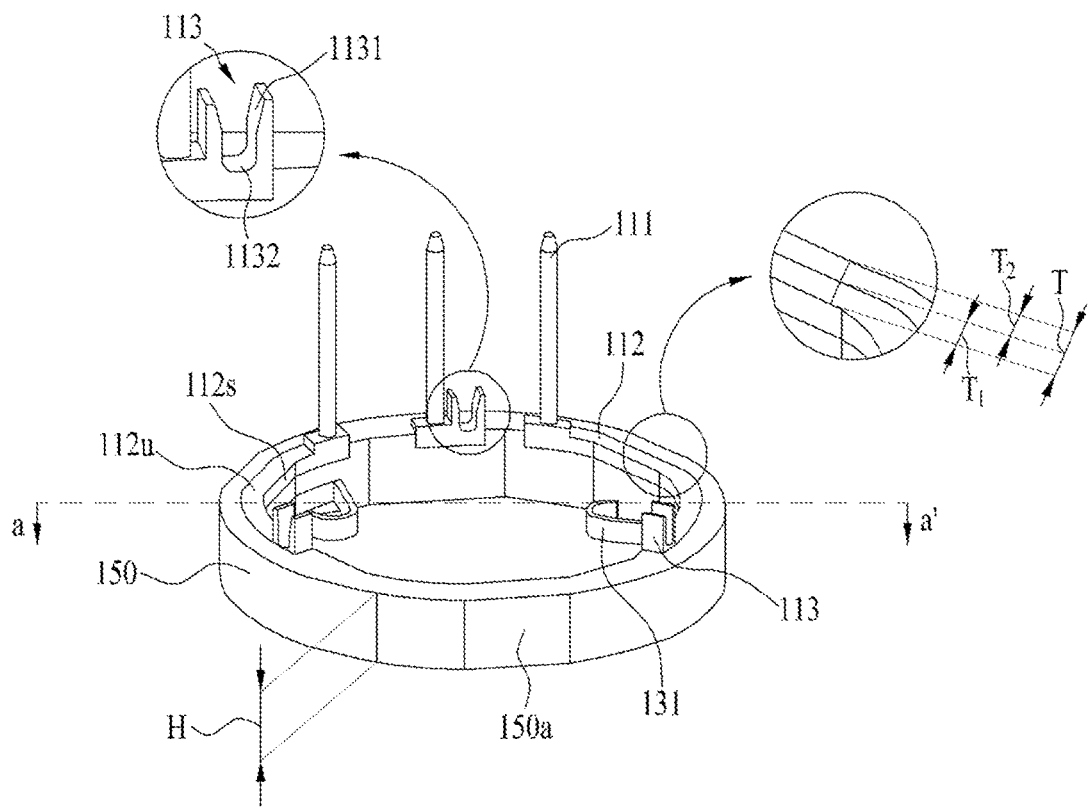
FIG. 6A is a perspective view of an insulator module of FIG. 4.
Figure 6B:
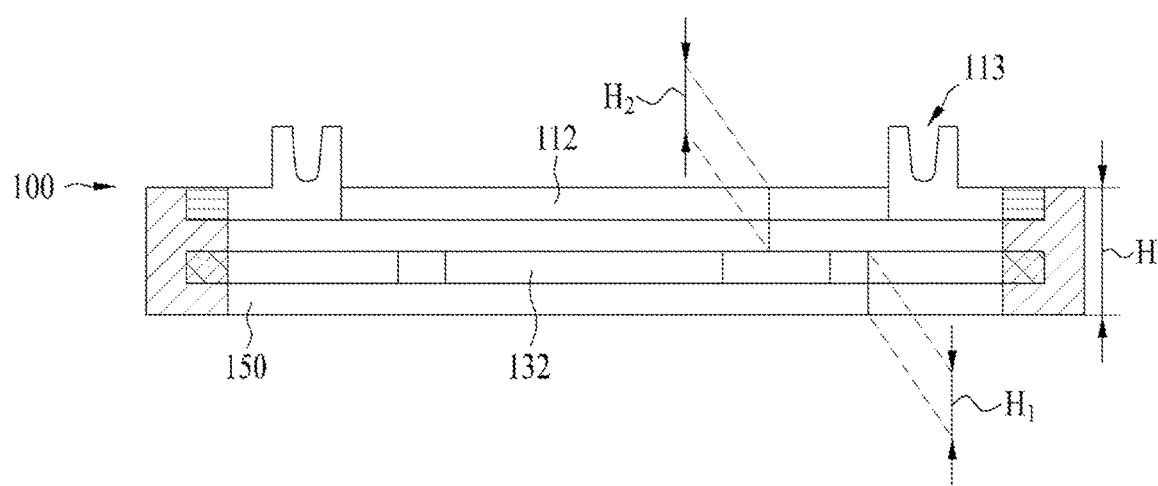
FIG. 6B shows a cross section view taken along a line of a-a' of FIG. 6A.

FIG. 6A is a perspective view of an insulator module of FIG. 4. FIG. 6B shows a cross section view taken along a line of a-a' of FIG. 6A.

Referring to FIGS. 6A and 6B, as described above, the insulator module 100 may include the insulator body 150.

Each power terminal unit 100 in accordance with the present embodiment includes a power terminal 113 protruding from the top of the body 150 within the radial region of the back yoke and connected to one of the 3-phase power lead wires 511 of the coil 510, a connection terminal 111 connected to the power terminal 113 and connected to the one of the 3-phase power lead wires 511, and a power connecting member 112 having one end connected to the power terminal 113 and the other end connected with the connection terminal 111.

The power terminal 113 may include a power terminal body 1132 upwardly protruding from the insulator body 150 and a guide groove 1131 defined in the body 1131 to receive and guide one of the 3-phase power lead wires 511 of the coil 510.

Each 3-phase power lead wires 511 may be fitted into the guide groove 1131. Preferably, the groove 1131 may have a width smaller than a diameter of the 3-phase power lead wire 511. Thus, the 3-phase power lead wire 511 may be press-fitted into the guide groove 1131.

In one example, a bottom face of the guide groove 1131 may have a predetermined angle of inclination to guide each 3-phase power lead wire 511.

The connection terminal 111 may be connected to each of the 3-phases power lead wires. Although not shown in the drawing, the connection terminal 111 is connected to a printed circuit board (PCB). The connection terminal 111 may be connected to the power terminal 113 via the power connecting member 112.

The power connecting member 112 electrically and physically connects the power terminal 113 and the connection terminal 111 with each other. A top face 112*u* of the power connecting member 112 may define a portion of a top face of the insulator module 100. A side face 112*s* of the power connecting member 112 may define a portion of the inner circumferential face of the insulator module 100.

That is, the top face 112*u* of the power connecting member 112 may be located on the top face of the insulator body 150 of the insulator module 100. The connection terminal 111 may extend upward from the top face 112*u*. The side face 112*s* of the power connecting member 112 may be curved to correspond to the circular shape of the insulator body 150 of the insulator module 100 to define a portion of the inner circumferential face of the insulator module 100. Thus, the power connecting member 112 may define a top portion of the insulator module 100.

However, the top face 112*u* of the power connecting member 112 does not necessarily define the top face of the insulator module 100. The insulator body 150 may be formed on the top face 112*u* of the power connecting member 112 such that the insulator body 150 may define a top face of the insulator module 100.

The neutral terminal 131 protrudes radially and inwardly of the back yoke and may be disposed on an inner face of the insulator body 150 of the insulator module 100. The neutral terminals 131 may be electrically and physically connected with each other via a neutral connecting member 132.

The neutral connecting member 132 may be curved to correspond to the circular shape of the insulator body 150 of the insulator module 100 to define a portion of an inner face of the insulator module 100.

The insulator body 150 of the present embodiment may be coupled to the top face of the stator core 300, have the height H for securing the insulation distance from the stator core 300, and have a predetermined thickness T in the radial direction. In addition, the insulator body 150 may be formed in a hollow cylindrical shape corresponding to the shape of the stator core 300.

Figure 8:
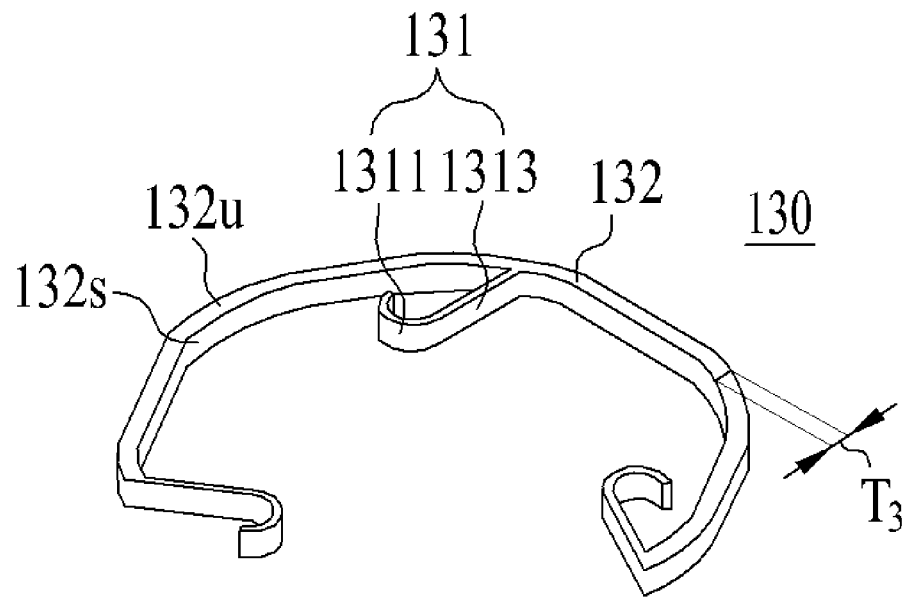
FIG. 8 is a perspective view of a state in which a neutral terminal unit is separated from an insulator module.
Figure 8:
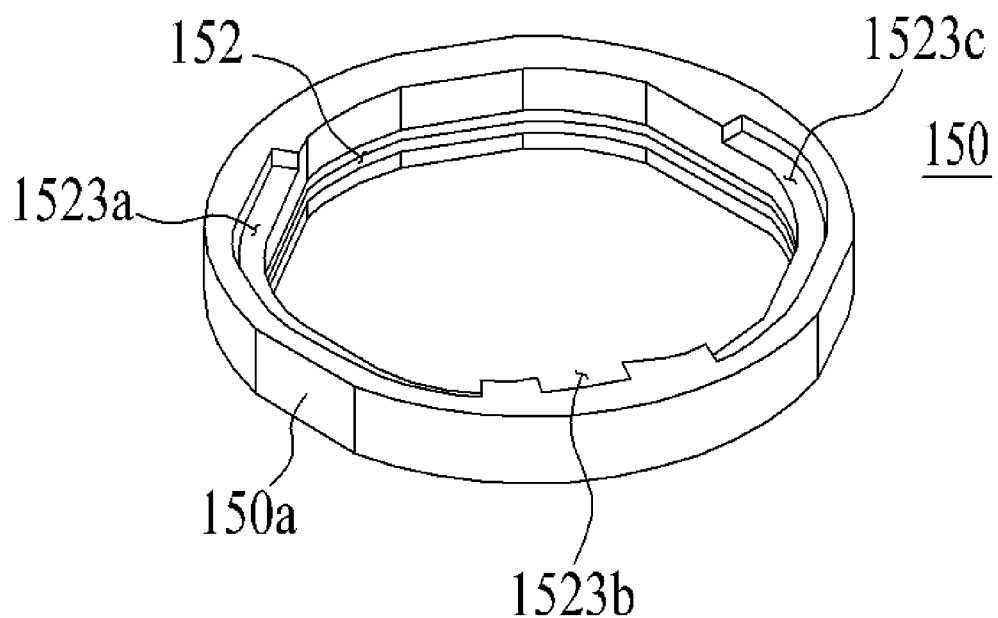

Referring to FIG. 8, each neutral terminal 131 may be formed in a hook shape, and may include an extension 1311 protruding inwardly of the insulator body 150 from the neutral connecting member 132 and a hook 1313 bent from one end of the extension 1311 toward an inner circumferential face of the lower insulator body 155. However, the shape of the neutral terminal 131 is not limited to a structure only including the extension 1311 and the hook 1313. Various shapes thereof configured such that the neutral terminal 131 is formed inside the lower insulator body 155 and is connected to each neutral-point lead wire 513 may be included herein.

The insulator body 150 may have the predetermined height H. The predetermined height H may correspond to a sum of a first height H1 of an lower insulator body 151 and a second height H2 of a upper insulator body 153, which will be described later.

A height of the neutral terminal unit 130 may be smaller than the first height H1. A height of the power terminal unit 110 may be smaller than the second height H2. Thus, the insulation between the terminal units and insulation between the terminal units and the stator core 300 may be ensured.

Preferably, the power terminals 113 may be formed at the same vertical level in the insulator module 100. The neutral terminals 131 may be formed at the same vertical level in the insulator module 100.

In one example, the insulator body 150 may have the predetermined thickness T. The top face 112*u* of the power connecting member 112 may have a first thickness T1 that is smaller than the thickness T. Therefore, the thickness T may correspond to a sum of the first thickness T1 and a remaining thickness T2 of the top face of the insulator body 150.

That is, the terminal units 110 and 130 may be radially and vertically surrounded with the insulator body 150.

Figure 7:
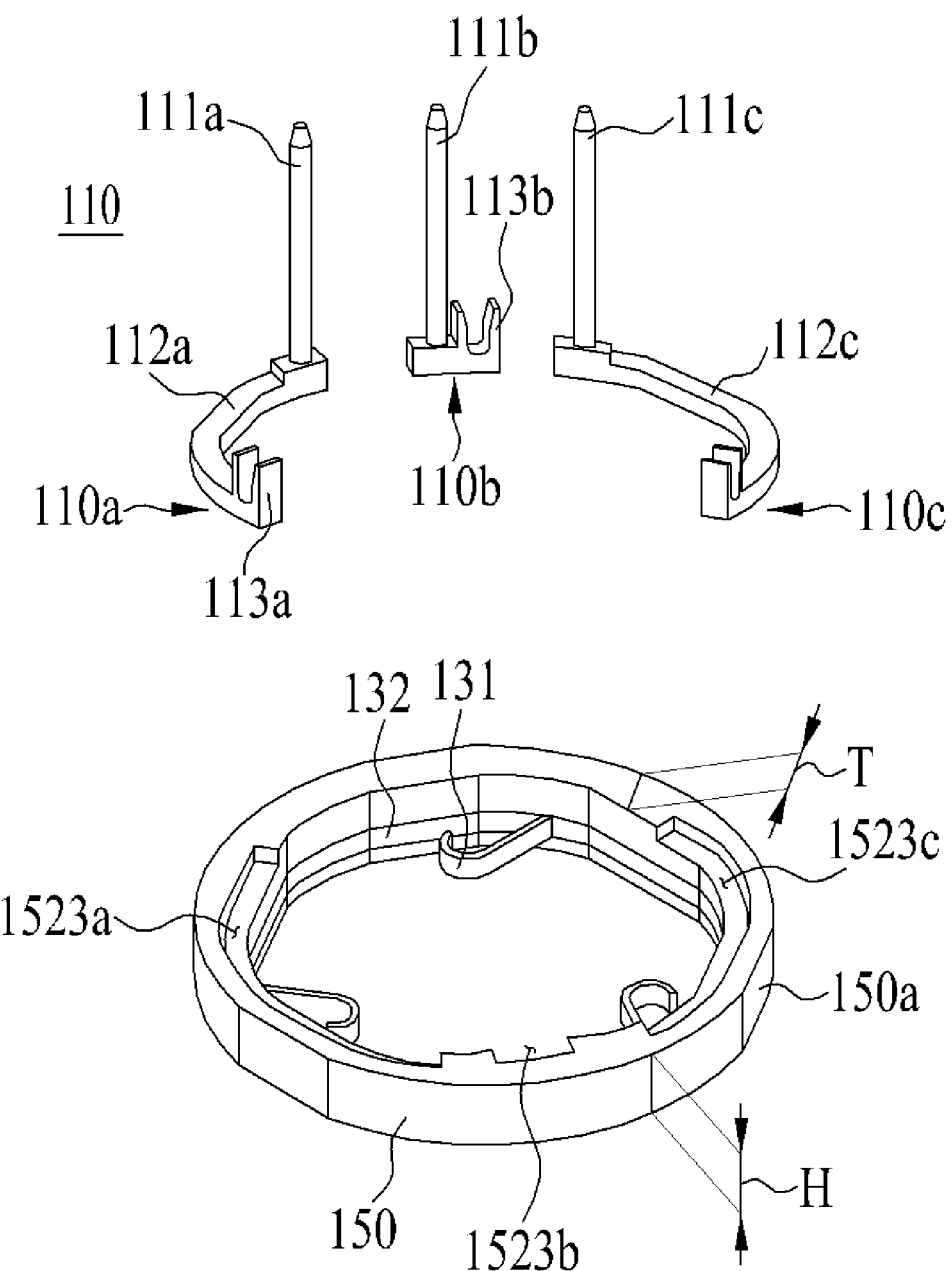
FIG. 7 is a perspective view of a state in which a power terminal unit is separated from an insulator module.

FIG. 7 is a perspective view of a state in which a power terminal unit is separated from an insulator module. FIG. 8 is a perspective view of a state in which a neutral terminal unit is separated from an insulator module.

Referring to FIG. 7, each power terminal unit 110 may be each of three separate members corresponding to three phases, respectively. In one power terminal unit 110*b*, a connection terminal 111*b* and a power terminal 113*b* may be directly electrically and physically connected to each other without a power connecting member 112. In the power terminal units 110*a* and 110*c* having the power connecting members 112*a* and 112*c*, the power connecting members 112*a* and 112*c* may be curved at the same curvature.

Further, the power terminals 113*a*, 113*b*, and 113*c* may be preferably spaced from each other at 120 degrees angular spacing. Each three-phase power lead wire 511 may be connected to each of the power terminals without bending thereof while passing through the radial thickness of the back yoke or insulator.

In one example, a receiving groove 1523 may be defined in a top face of the insulator body 150 of insulator module 100 to allow each of the power terminal units 110*a*, 110*b*, and 110*c* to be seated thereon respectively. The receiving grooves 1523*a*, 1523*b*, and 1523*c* may correspond to the power terminals respectively. The receiving groove 1523*a*, 1523*b*, and 1523*c* may be spaced from each other at a predetermined spacing. Thus, an insulator portion may act as the insulating spacing.

Referring to FIG. 8, the neutral terminal unit 130 may include a neutral connecting member 132 curved along the inner circumferential face of the insulator body 150 of the insulator module 100. The neutral connecting member 132 may have a third thickness T3 that is smaller than a predetermined thickness T of the insulator body 150 of the insulator module 100. Preferably, the third thickness T3 may be the same thickness as the first thickness T1.

In one example, a receiving groove 152 in which the member 132 of the neutral terminal unit 130 is seated may be formed in the inner circumferential face of the insulator body 150 of the insulator module 100.

Figure 9:
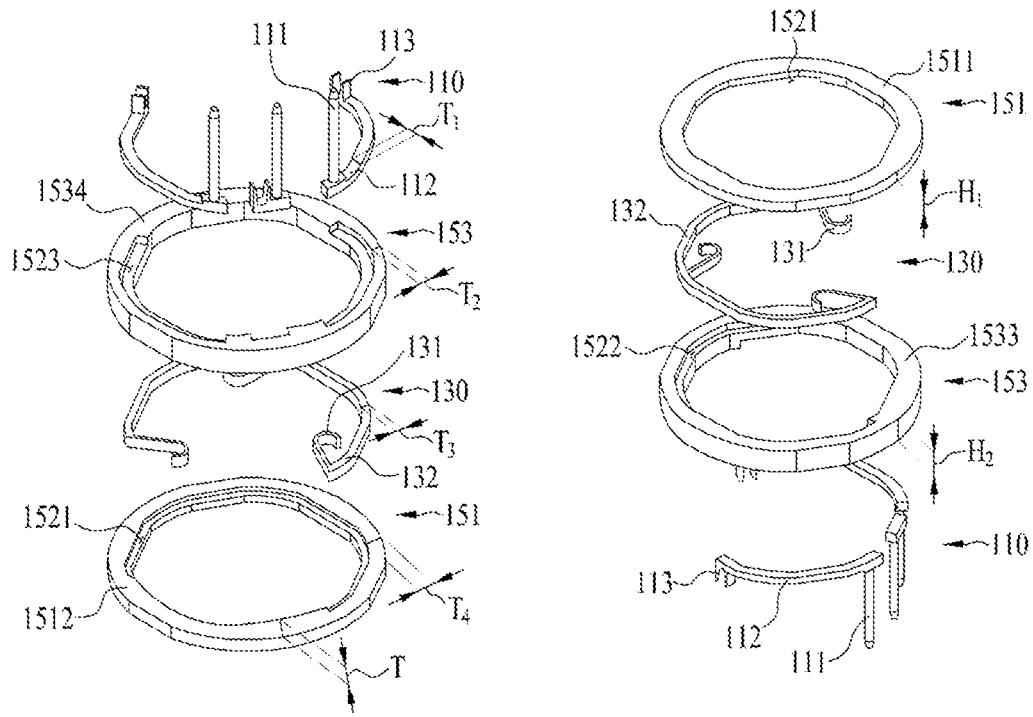
FIG. 9 is an exploded perspective view of an insulator module.

FIG. 9 is an exploded perspective view of an insulator module. Referring to FIG. 9, the insulator body 150 may include a lower insulator body 151 positioned above the stator core 300 to insulate between the stator core 300 and the neutral terminal unit 130, and an upper insulator body 153 positioned on a top face of the lower insulator body 151 to insulate between the neutral terminal unit 130 and the power terminal unit 110.

The lower insulator body 151 may have a first face 1511 in contact with the top of the stator core 300 and a second face 1512 in which a receiving groove 1521 is formed for receiving the neutral terminal unit 130 therein. The upper insulator body 153 has a third surface 1533 in which a receiving groove 1522 in which the neutral terminal unit 130 is seated, the third surface 1533 being in contact with the second surface 1512, and a fourth surface 1534 in which a receiving groove 1523 is formed, in which the power terminal unit 110 is seated.

Each of the upper insulator body 151 and the lower insulator body 153 has a predetermined thickness T. The lower insulator body 151 and the upper insulator body 153 are stacked to define the predetermined height H.

That is, each of the lower insulator body 151 and upper insulator body 153 has the same thickness as the thickness T of the insulator module 100 and has a flat surface on each of an inner circumferential face and outer circumferential face thereof. When the sum of the first height H1 of the lower insulator body and the second height H2 of the upper insulator body corresponds to the predetermined height H, when the lower insulator body 151 and the upper insulator body 153 are stacked on each other.

The lower insulator body 151 extends from the first face 1511 to the second surface 1512 to form the first height H1. The lower insulator body 151 at a vertical level in which the receiving groove 1521 is formed may have a fourth thickness T4. The receiving groove 1521 may receive the neutral terminal unit 130 therein. The neutral terminal unit 130 may have a third thickness T3 such that the sum of the third thickness T3 and the fourth thickness T4 is equal to the thickness T from the inner circumferential face to the outer circumferential face of the lower insulator body 151.

That is, the lower portion of the neutral terminal unit 130 may be surrounded with the lower insulator body 151.

The upper insulator body 153 extends from the third face 1533 to the fourth surface 1534 to define the second height H2. A receiving groove 1522 in which the neutral terminal unit 130 rests may be defined in the third face 1533. A receiving groove 1523 in which the power terminal unit 110 is seated may be formed in the fourth surface 1534.

Thus, the receiving groove 1522 may be defined in the third face 1533 and the second face 1512 and may receive the neutral terminal unit 130 therein. The thickness of the portion in which the receiving groove 1522 is formed in the third face 1533 may be the same as the fourth thickness T4.

In addition, the third face 1533 and the fourth face 1534 are spaced apart by a predetermined vertical dimension so that the lower insulator body 153 has the second height H2. The sum of the depths of the receiving groove 1522 formed in the third face 1533 and the receiving groove 1523 formed in the fourth face 1534 may be smaller than the predetermined vertical dimension.

That is, to perform insulation between the neutral terminal unit 130 and the power terminal unit 110 seated in the receiving grooves 1522 and 1523 respectively, the sum of the depths of the receiving grooves formed in the upper and lower portions of the upper insulator body 153 respectively may be preferably smaller than the entire height of the upper insulator body 153.

In one example, the thickness of the portion of the upper body 153 at the level at which the receiving groove 1523 in which the power terminal unit 110 is accommodated is a second thickness T2. The power connecting member 112 has a first thickness T1 such that the sum of the second thickness T2 and the first thickness T1 is equal to the thickness T from the inner circumferential face to the outer circumferential face of the upper insulator body 153.

In the above-described embodiment, the layers forming the insulator module 100 may be stacked on each other. However, the present disclosure is not necessarily limited to the stacking method. The insulator module may be formed via an insert injection molding.

Figure 10:
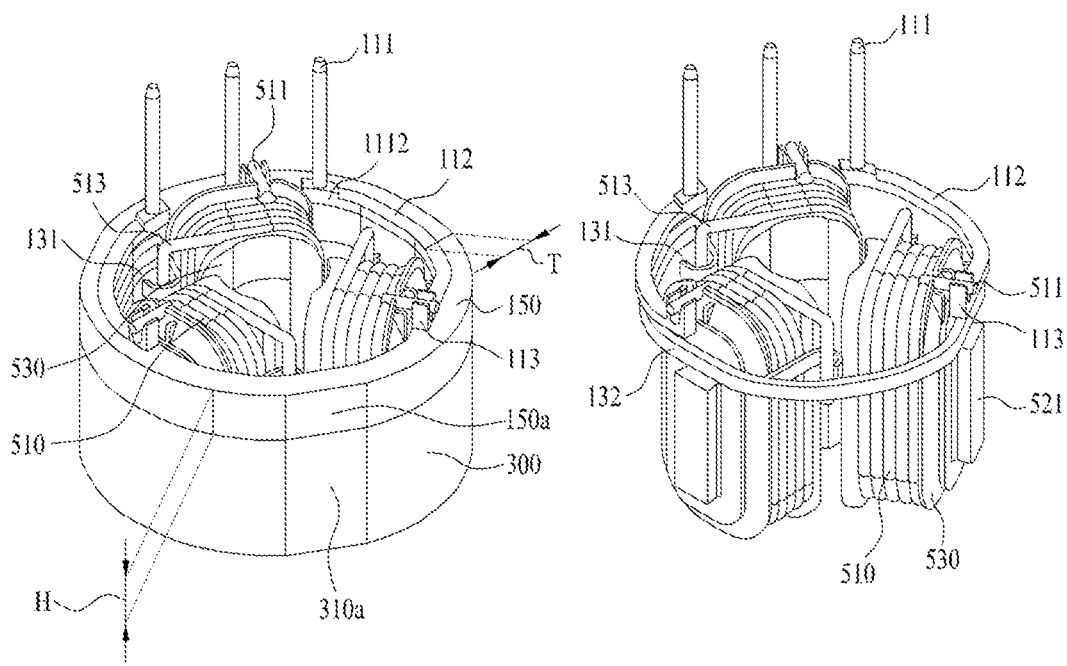
FIG. 10 is a perspective view of a motor according to an embodiment of the present disclosure.

FIG. 10 is a perspective view of a motor according to an embodiment of the present disclosure.

Referring to FIG. 10, the divided-core 500 in the present embodiment may be inserted into the stator core 300 and be connected to the insulator module 100. The divided-core 500 may be inserted into the stator core 300 in the axial direction from below the stator core 300. The insulator module 100 may be brought into contact with the top face of the stator core 300 along the axial direction from above the stator core 300.

The insulator module 100 has the predetermined height H. The height H may mean the vertical dimension from a bottom face in contact with the top face of the stator core 300 to the top face of the insulator module 100. In this embodiment, the power connecting member 112 may define a portion of the top face of the insulator module 100.

The coils 510 are drawn horizontally from the top of the teeth 520 toward the inner face of the back yoke while being received in a groove 531 formed in a top face of the insulator 530. Then, the 3-phase power lead wires 511 of the coils may be connected to the power terminals 113. Three power terminals 113 corresponding to the 3-phases may be spaced from each other at a 120 degrees angular spacing. At least two of the power terminals 113 corresponding to the 3-phases may be electrically connected to the connection terminals 111 via the power connecting members 112 respectively.

The coils 510 are drawn horizontally from the top of the teeth 520. Then, the neutral-point lead wires 513 may be bent downwardly and connected to the neutral terminals 131. The neutral terminal 131 may include the extension 1313 extending radially and inwardly of the back yoke from the neutral connecting member 132 and the hook 1311 bent from the extension 1313. The extension 1313 may extend radially and inwardly of the back yoke to be insulated from the coil 510. The hook 1311 is preferably bent in a region corresponding to an adjacent tooth of the divided teeth. Accordingly, each of the neutral-point lead wires 513 may be connected to the hook 1311 to secure the insulation distance from the coil 510 located inside the stator core 300.

As a result, each of the 3-phases power lead wires 511 may be connected to each terminal within a radial region of the back yoke. Since the insulator module 100 has the predetermined thickness T corresponding to the radial dimension of the back yoke, the 3-phases power lead wires 511 may be connected to the power terminals 113 within the thickness T.

Further, each of the neutral-point lead wires 513 may also be connected with each terminal within the radial region of the back yoke. In detail, the insulator module 100 has the predetermined height H and is present above the stator core 300 and is formed in the shape corresponding to the cylindrical shape of the stator core 300, each of the neutral-point lead wires 513 may be connected with each terminal inside the insulator module 100, that is, may be connected to each neutral terminals 131 present in the height H.

That is, the connection points between the both lead wires 511 and 513 and the terminals may be present within the radial region of the back yoke. Thus, the insulation performance may be ensured. Further, at the same time, the structural position between the terminal units 110 and 130 according to the thickness T and the height H of the insulator module 100 may improve the insulation performance. Therefore, an outer diameter of the stator may be reduced and thus a radial thickness of the back yoke may be reduced, so that miniaturization and lightening of the motor may be implemented, and at the same time, insulation performance between the terminal units 110 and 130 may be secured.

Although the present disclosure has been described with reference to the preferred embodiments of the present disclosure, those skilled in the art may understand that the present disclosure may be variously modified and changed without departing from the spirit and scope of the present disclosure as described in the claims below.

What is claimed is:

1. A motor comprising:
   a stator; and
   a rotor configured to rotate with respect to the stator,
   wherein the stator includes:
      a stator core defining a back yoke,
      teeth that extend radially from the back yoke,
      a plurality of coils that define 3-phase power lead wires, that define neutral-point lead wires, and that are configured to wrap around the teeth, respectively, each coil having a first end drawn out to define a 3-phase power lead wire and a second end drawn out to define a neutral-point lead wire, and
      an insulator module that is configured to be coupled to a top face of the stator core and that includes:
         an insulator body,
         a plurality of power terminal units that are connected to the 3-phase power lead wires, that are divided into three power terminal units corresponding to the 3-phase power lead wires located at a same vertical level, and that are spaced from each other at a first interval around a circumference of the insulator body, and
         a neutral terminal unit connected to a neutral point of the plurality of coils,
   wherein the insulator body is configured to provide insulation between the three power terminal units and the neutral terminal unit,
   wherein at least one of the three power terminal units is curved along the insulator body, and
   wherein the insulator body has a hollow cylindrical shape, the insulator body including:
      a first receiving groove that is defined at an inner circumferential face of the insulator body and that supports the neutral terminal unit, and
      a plurality of second receiving grooves that are defined at a top face of the insulator body and that support the three power terminal units, respectively.

2. The motor of claim 1, wherein each of the plurality of power terminal units includes:
   a power terminal that is disposed at the top face of the insulator body and that is connected to one of the 3-phase power lead wires, and
   a connection terminal connected to the power terminal and the one of the 3-phase power lead wires.

3. The motor of claim 2, wherein the power terminal includes:
   a power terminal body protruding upward from the top face of the insulator body, and
   a guide groove that is provided at the power terminal body and that is configured to receive the one of the 3-phase power lead wires.

4. The motor of claim 2, wherein each of the plurality of power terminal units includes a power connecting member having a first end connected to the power terminal and a second end connected to the connection terminal.

5. The motor of claim 4, wherein the power connecting member is disposed at a portion of the top face of the insulator body.

6. The motor of claim 2, wherein the 3-phase power lead wires are drawn radially and outwardly from the back yoke and connected to the power terminal of each of the plurality of power terminal units, respectively.

7. The motor of claim 1, wherein the neutral terminal unit includes:
   a plurality of neutral terminals that protrude in a radial direction of the back yoke and that are connected to the neutral-point lead wires, respectively, and
   a neutral connecting member connecting the plurality of neutral terminals.

8. The motor of claim 7, wherein the neutral connecting member contacts a portion of an inner face of the insulator module.

9. The motor of claim 7, wherein the plurality of neutral terminals are disposed at a same vertical level.

10. The motor of claim 1, wherein the insulator body includes:
    a lower insulator body that is provided at a top face of the stator core and configured to provide insulation between the stator core and the neutral terminal unit, and
    an upper insulator body that is provided at a top face of the lower insulator body and configured to provide insulation between the neutral terminal unit and the plurality of power terminal units.

11. The motor of claim 10, wherein the lower insulator body includes (i) a first face that contacts the top face of the stator core and (ii) a second face that defines a part of the first receiving groove configured to receive a lower portion of the neutral terminal unit therein, and
    wherein the upper insulator body includes (i) a third face that contacts the second face and that defines another part of the first receiving groove configured to receive an upper portion of the neutral terminal unit therein and (ii) a fourth face that defines the plurality of second receiving grooves configured to receive the three power terminal units therein.

12. The motor of claim 11, wherein the third face and the fourth face are separated in a predetermined vertical dimension to have a height of the upper insulator body in a predetermined dimension, and
    wherein a sum of vertical dimensions of the first receiving groove located in the third face and the plurality of second receiving grooves located in the fourth face of the upper insulator body is less than the predetermined dimension.

13. A motor comprising:
    a stator; and
    a rotor configured to rotate with respect to the stator,
    wherein the stator includes:
       a stator core having (i) an inner circumferential face defining a back yoke and (ii) a groove provided along the inner circumferential face,
       teeth, each tooth including (i) a coupling portion configured to be coupled to the groove and (ii) a wound portion that extends radially and inwardly from the coupling portion,
       a plurality of coils configured to wrap around the teeth, respectively, and
       an insulator module that is configured to be coupled to a top face of the stator core and that includes:
          an insulator body,
          a plurality of terminal units that are connected to the plurality of coils, that are divided into three power terminal units corresponding to 3-phase power lead wires located at a same vertical level, and that are spaced from each other at a first interval around a circumference of the insulator body, and
          a neutral terminal unit connected to a neutral point of the plurality of coils, wherein the insulator body configured to provide insulation between the three power terminal units and the neutral terminal unit, wherein the plurality of terminal units and the insulator body are stacked vertically to define the insulator module, wherein at least one of the three power terminal units is curved along the insulator body, and wherein the insulator body has a hollow cylindrical shape, the insulator body including:
- a first receiving groove that is defined at an inner circumferential face of the insulator body and that supports the neutral terminal unit, and
- a plurality of second receiving grooves that are defined at a top face of the insulator body and that support the three terminal units, respectively.

14. The motor of claim 13, wherein the plurality of coils define the 3-phase power lead wires and neutral-point lead wires, each coil having a first end drawn out to define a 3-phase power lead wire and a second end drawn out to define a neutral-point lead wire, and wherein the plurality of terminal units include:
- a plurality of power terminals that are connected to the 3-phase power lead wires, respectively, and
- a neutral terminal connected to the neutral-point lead wire.

15. The motor of claim 14, wherein each of the plurality of power terminal units includes one power terminal that is connected to one of the 3-phase power lead wires and that is provided at a top face of the insulator body and at a radial region of the back yoke, and wherein the neutral terminal unit includes a plurality of neutral terminals that are respectively connected to the neutral-point lead wires and that are disposed radially and inwardly from the back yoke.

16. The motor of claim 15, wherein the 3-phase power lead wires are drawn radially and outwardly from the back yoke and are respectively connected to the plurality of power terminals.

17. The motor of claim 16, wherein each of the plurality of terminal units further includes:
- a connection terminal connected to the power terminal and the one of the 3-phase power lead wires, and
- a power connecting member having a first end connected to the power terminal and a second end connected to the connection terminal.

18. The motor of claim 17, wherein the connection terminal and the power connecting member are located in a radial region of the insulator body.

19. The motor of claim 16, wherein the neutral-point lead wires are connected to the plurality of neutral terminals, respectively, the plurality of neutral terminals disposed inwardly from the insulator body.

20. The motor of claim 19, wherein the neutral terminal unit includes a neutral connecting member connecting the plurality of neutral terminals, and wherein the neutral connecting member is disposed at the first receiving groove defined at the inner circumferential face of the insulator body.

* * * * *